United States Patent [19]

Loy et al.

[11] Patent Number: 4,758,076
[45] Date of Patent: Jul. 19, 1988

[54] COMBINED NIGHT/DAY VIEWING APPARATUS

[75] Inventors: Fernand R. Loy, Sceaux; Jean-Luc Espie, Chatenay Malabry, both of France

[73] Assignee: U.S. Philips Corporation, New York, N.Y.

[21] Appl. No.: 830,297

[22] Filed: Feb. 18, 1986

[30] Foreign Application Priority Data

Feb. 22, 1985 [FR] France ................................. 85 02575

[51] Int. Cl.[4] ...................... G02B 23/08; G02B 23/12; G02B 26/08
[52] U.S. Cl. .................................. 350/538; 350/486; 350/541
[58] Field of Search ............... 350/169, 171, 273, 486, 350/438, 540-544, 557-558, 569, 571

[56] References Cited

U.S. PATENT DOCUMENTS

| | | | |
|---|---|---|---|
| 1,730,712 | 10/1929 | Wright | 350/171 |
| 3,407,302 | 10/1968 | Bouwers | 350/538 |
| 3,456,999 | 7/1969 | Hopp | 350/540 |
| 3,509,344 | 4/1970 | Bouwers | 350/538 |
| 4,145,119 | 3/1979 | Tausch | 350/618 |
| 4,467,190 | 8/1984 | Hadani | 350/538 |

FOREIGN PATENT DOCUMENTS

| | | | |
|---|---|---|---|
| 548018 | 4/1932 | Fed. Rep. of Germany | 350/171 |
| 111616 | 6/1984 | Japan | 350/171 |
| 1069745 | 5/1967 | United Kingdom | 350/171 |

*Primary Examiner*—William H. Punter
*Attorney, Agent, or Firm*—F. Brice Faller

[57] ABSTRACT

Optical axes of the day path and of the night path extend in a sagittal plane (5,9) of the carrying vehicle and the passage from the night path to the day path or conversely is effected by means for displacing a first reflector parallel to the plane in order that the input light beams are directed to the optical axis of the day path or of the night path. A second output reflector along the optical axis for the day path is simultaneously displaced from an active position, for viewing by day, to a concealed position, for viewing by night, when said first reflector is displaced to deflect said beams along said night path.

12 Claims, 3 Drawing Sheets

COMBINED NIGHT/DAY VIEWING APPARATUS

BACKGROUND OF THE INVENTION

The invention relates to a combined night/day viewing apparatus for an armoured venicle. A single housing includes a night path and a day path as well as a first movable input reflector for causing the input light beams originating from the field of view to deviate at least in the direction of the optical axis of the night path. The night path is constituted by an objective, a light intensifier tube and an ocular. The day path is constituted by an optical system having an enlargement 1 magnification comprising at least one second output reflector.

The viewing apparatus according to the invention is such that the enlargement is equal to 1 for the day path and is of the order of 1 for the night path. For both paths attempts are made to obtain the largest possible field of view. Through this kind of apparatus, which is arranged so as to traverse the armouring of a vehicle, the view is periscopic. The invention is used more particularly for an episcope for driving a tank.

The French Utility Models Nos. 2,377,647 and 2,377,648 disclose a night/day viewing apparatus, that is to say an optical periscopic apparatus contained in a single housing that can be used for all the degrees of illumination of the object viewed, both with a bright sky and in the night with a clouded sky. When such an apparatus is arranged in an armoured car, it can consist of a hermetic assembly that can be arranged in the standardized opening provided until now for receiving both night viewing apparatus and day viewing apparatus. These technical characteristics and these functions are also examined at the beginning for the viewing apparatus described hereinafter. In fact it is very disadvantageous in both cases to use immovable distinct optical apparatus for the night and the day, especially because of the necessity on the one hand to proceed to switching operations, during which the view through the optical apparatus is no longer possible, and on the other hand to be forced to arrange the apparatus not utilized without the risk of damage of the latter or of congestion of the dwellingplace of the vehicle, which is tiny.

A compact construction comprising a single housing of standardized dimensions can be comparatively readily obtained in a viewing apparatus, for which the fields of view are narrow, i.e. of the order of 5° to 10°, and for which the enlargements obtained are substantial, i.e. of the order of 5 to 10, the vehicle provided with the viewing apparatus being normally stationary during viewing. On the contrary, viewing has to take place with a normal view, especially for driving vehicles, i.e. for a small enlargement equal or substantially equal to unity, which takes place with a large field of view. A largest possible field of view is desired and it has to be ensured that the compact construction obtained due to the combination of a day viewing apparatus and a night viewing apparatus in the same housing is not accompanied by a reduction of the field of view.

SUMMARY OF THE INVENTION

The invention has for its object to provide a combined night/day viewing apparatus having a large field obtained in a single housing that can be arranged in the standardized opening provided until now for receiving both night viewing apparatus and day viewing apparatus.

The invention further has for its object to provide the adaptations necessary for the combination in a single housing of a day viewing apparatus and a night viewing apparatus.

The optical axes of the day path and of the night path extend in the same plane parallel to a longitudinal axis of the armoured vehicle. The passage from the night path to the day path or conversely is effected by displacement means for displacing at least the first reflector parallel to the plane so that the light beams originating from the field of view are directed either to the optical axis of the day path or to the optical axis of the night path.

The optical axes of the day path and of the night path are preferably inclined to each other upwards at a small angle, which has become possible due to the fact that the objective of the night path has a smaller diameter than the subjacent light intensifier tube, the first reflector being able to direct the incoming light beams to one or to the other optical axis, for example by a rotary movement at a small angle, i.e. of the order of 10° to 20°, as a result of which the space occupied by the viewing apparatus becomes very small.

When the night path is made operative, light beams are produced from the light intensifier tube, these beams being directed especially to the face of the observer. Due to the combination in the same housing of the two night/day systems, these reflected light beams can traverse at least in part the day viewing system from the interior to the exterior of the armoured car, as a result of which the armoured car could be seen by a hostile observer, which should be avoided. For this reason, the combined night/day viewing apparatus comprises automatic obturation means of the day path and automatic means for making operative the light intensifier tube during the passage from the day path to the night path, which causes the second reflector to pass from an active position to a concealed position.

BRIEF DESCRIPTION OF THE DRAWING

In the various Figures, the same reference symbols designate the same elements with the same functions.

DETAILED DESCRIPTION OF THE PREFERRED EMBODIMENTS

Figure 1:
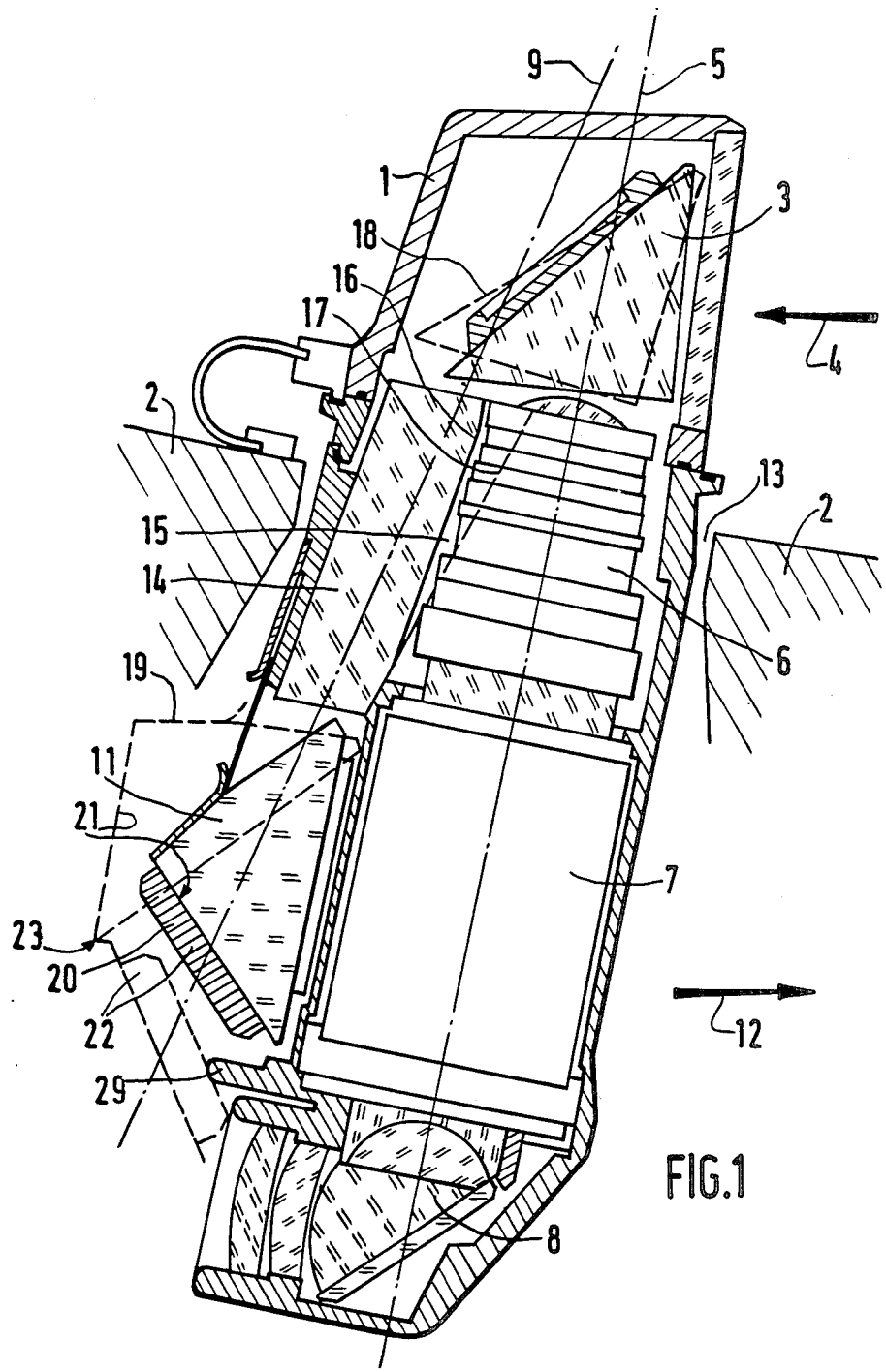
FIG. 1 is a side elevation in sectional view of the housing and the optical part of the viewing apparatus.

The viewing apparatus shown in FIG. 1 comprises a housing 1 which is arranged so as to traverse the wall 2 of an armoured car and in which a first movable input reflector 3 can occupy two different positions to cause the input light beams originating from the field of view and indicated by an arrow 4 to deviate in two different directions both substantially at right angles to the wall 2. The reflector 3 is preferably a total-reflection prism of triangular cross-section; it may alternatively be a mirror. In the position of the reflector 3 indicated by full lines, the input light beams are directed after reflection to an optical axis 5 (the optical axis of the night path), along which are arranged an objective 6, a light intensifier tube 7 and an ocular 8. In the position indicated by broken lines superimposed on it, the input beams are directed to an optical axis 9 (the optical axis of the day path), the day path being constituted by an optical system having an enlargement 1 comprising a prism or a mirror constituted by at least one second output reflector 11. The optical axes 5 and 9 extend in the same plane parallel to a longitudinal axis 12 of the armoured car, the plane being in this case that of FIG. 1. The passage from the night path to the day path or conversely is effected by displacement means, described below in greater detail with reference to FIGS. 2, 3 and 4. These displacement means serve to displace at least the first reflector 3 in order to cause it to pass from one to the other of its two positions indicated above.

The opening 13, in which the viewing apparatus is secured, is preferably the opening which is normally provided to receive both night viewing apparatus and day viewing apparatus, this economical adaptation being possible in the combined arrangement described above without a noticeable loss of the field of view. The method of securing with the required tightness is conventional and well known, for which reason it is not illustrated and described in FIG. 1.

The optical system of the day path shown in FIG. 1 is constituted by three prisms, i.e. the input prism 3, an intermediate prism 14 substantially in the form of a parallelepiped, and a total-reflection output prism constituting the second reflector 11. The refractive index of the glass used for these three prisms is high, i.e. of the order of 1.6, which for a given section available for the day path through the opening 13 permits of obtaining a large field. In this connection it should be noted that the intermediate prism 14 partly encloses the objective 6 of the night path substantially of cylindrical form or slightly in the form of a truncated cone by means of an identation 15 shown in FIG. 1 between the full line 16 and the broken line 17. The identation 15 substantially of cylindrical form can be obtained by working the prism 14. The reduced size of the apparatus is thus obtained in that the objective of the night path is recessed into the intermediate prism of the day path. The field of view of the day path consequently has a slight central occultation, which is not objectionable for the observer, taking into account its small size with respect to the distance between the pupils.

Figure 2:
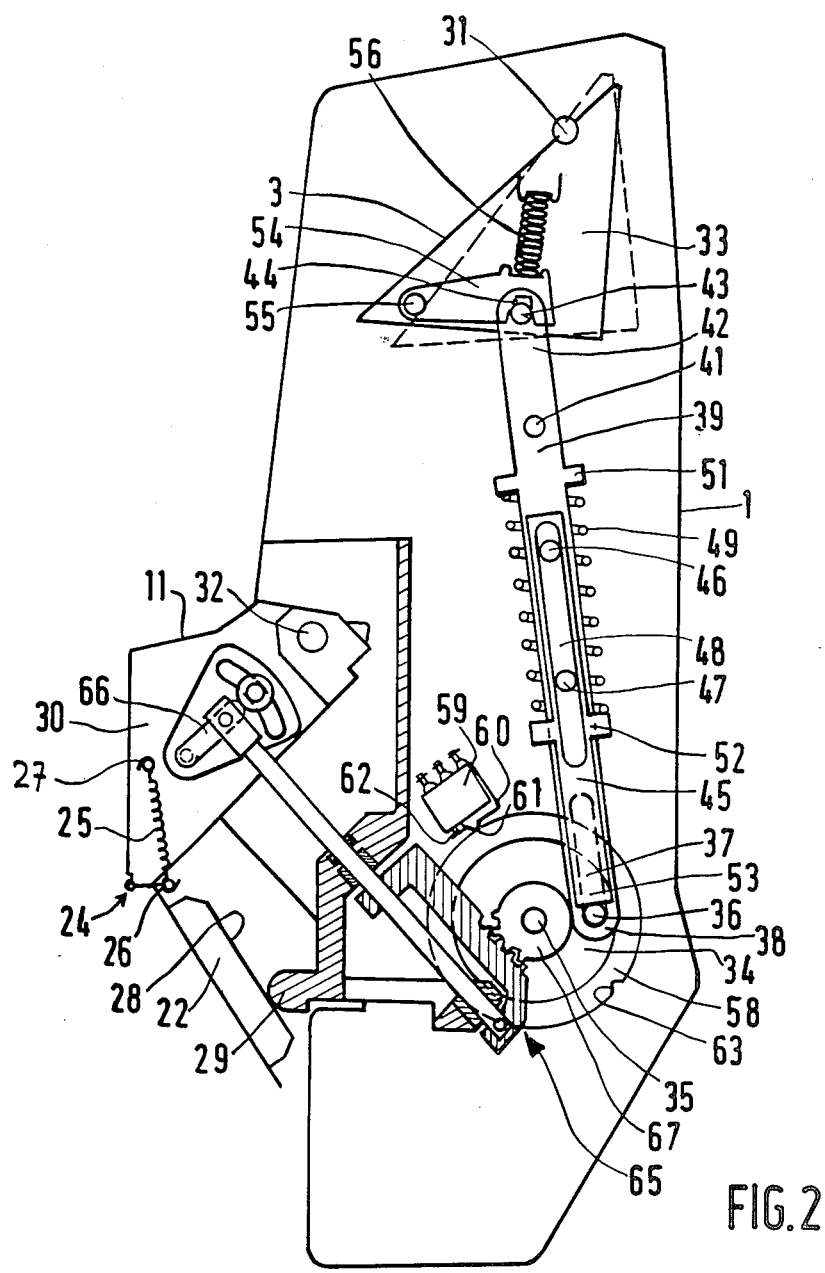
FIG. 2 shows in an elevation similar to that of FIG. 1 an embodiment of the means for simultaneously displacing the first and second reflectors.

If moreover the objective of the night path is slightly in the form of a truncated cone reduced in thickness in the upward direction, as shown in FIG. 1, it is advantageous that the optical axes 5 and 9 are inclined with respect to each other upwards at a small angle of the order of 15°, which permits of reducing the displacement of the first reflector 3 to a rotation of small amplitude and hence of limiting the size of this reflector, especially in the case in which a prism is used. In FIG. 1, the rotation of the prism 3 between its two stable positions is equal to about 10°. The mechanism controlling the displacement of the first reflector 3, which displacement may alternatively be a translatory movement from the front to the back, causes this reflector to pass from its position indicated by full lines to that indicated by broken lines. This mechanism preferably also controls the movement of the second reflector 11 between a concealed position for viewing by night, indicated the full line, and an active position, indicated by the broken line 19. In the position of viewing by day, the optical system constituted by the three prisms 3, 14 and 11, is equivalent to the conventional day viewing apparatus having two prisms with two respective reflecting surfaces in the form of a periscope. In the concealed position for viewing by night, the second stable position obtained preferably by rotation for the prism 11, the space around the ocular 8 is left free in order to permit viewing through the ocular. From the light beam originating from the light intensifier tube 7 which is reflected by the face of the observer and which would tend to penetrate through the output surface 21 of the second reflecting prism 11, only a small part can traverse the prisms 14 and 3. Even if this light reflection is small, it may be sufficient to indicate to a hostile observer in the vicinity of an armoured car the presence of this armoured car. For this reason, it is preferably ensured that an obturator of the day path is automatically made operative during the passage from the day path to the night path. This obturation is effected by means of an obturator shutter 22 hinged substantially along the rib 23 of the prism 11 on the support of the latter at points 24 (cf. FIG. 2). The shutter 22 is held in the stable opened position for viewing by day and in the stable closed position for viewing by night by obturation of the output surface 21 of the prism 11 by means of a spring 25 shown in FIG. 2. The anchorage of the spring 25 at a point 26 on the shutter 22 and at a point 27 on the support 30 of the prism 11 is designed so that a return moment is exerted on the shutter to pull the latter either in the direction of the surface 21 of the prism 11 or in the opposite direction, depending upon the angular position of the shutter with respect to the prism. The projection of the point(s) 26 on the plane of FIG. 2 is situated either on one side of the straight line passing through the projections of the points 24 and 27 in this plane or on the opposite side, depending upon this angular position. In the active position of the second reflector 11, which is only shown in FIG. 2 and is indicated by broken lines in FIG. 1, the shutter 22, which has been opened manually by the observer in order to permit of viewing by day, abuts by its external surface 28 against an embossed part 29 formed for this purpose on the housing 1. During the passage to the night position by a simultaneous rotation in the forward sense of the two prisms 3 and 11 about journalling means 31 and 32, respectively, in the housing 1, the external surface 28 of the shutter 22 slides along the embossed part 29, the points 24 and 26 approach this embossed part and the shutter 22 is taken along by rotation in the backward sense with respect to the prism 11. For a given angle of rotation of the prism 11, at which the points 24, 26 and 27 are in the same plane, the shutter 22 is in an unstable position of equilibrium, beyond which the spring 25 pulls it into its closed position, as shown by full lines in FIG. 1. In order to improve the viewing conditions by night, it is preferably ensured that the external surface 28 of the shutter 22 is provided with a coating of a flexible thick material shown in sectional view at 20 in FIG. 1. This coating serves as a headrest so that the observer can look through the ocular 8 without being hindered by any abrupt movements of the vehicle. The ocular 8 shown in FIG. 1 is preferably a binocular magnifying-glass having a large field as described in French patent application No. 2,535,860. This binocular permits of obtaining a field of view of the order of 80° in the bearing position and of 50° in the site position. FIG. 2 shows preferred embodiment of the mechanism for displacing the first and second reflectors (prisms) 3 and 11 simultaneously from one of their stable position for viewing by day and by night, respectively, to the other stable position for viewing by night and by day, respectively. In this Figure, the optical elements are not shown for the sake of clarity of the drawing, except for the two prisms 3 and 11, of which only the supports 33 and 30, respectively, are visible in this side elevation. The displacement of the prism 3 is effected by means of a wheel 34 that can be operated manually in the housing 1 and is hinged about a control shaft 35 rotatably supported in the housing by means of a crank, no shown, which is accessible from the outside of the housing. The wheel 34 supports a first bolt 36 engaging a first slot 37 formed at a first end 38 of a lever 39, the latter being pivotable about a pivot 41 which is integral with the housing and is disposed between the wheel 34 and the prism 3. The second end 42 of the lever 39 carries a second bolt 43 engaging a second slot 44 associated with the support 33 of the prism 3. Spring means are provided for permanently urging the bolt 36 in the direction of the end 38, the two stable positions being obtained when the bolt 36 abuts against the inner end of the slot 37 either on one side or on the other side with respect to the shaft 35. The spring means preferably include a slide 45 arranged on the lever 39 and adapted to perform a translatory movement with respect to the latter by means of two bolts 46 and 47 on the lever 39 which can slide in a slot 48 in the slide 45. A helical spring 49, shown in sectional view, acts as a compression spring, between a shoulder 51 of the lever 39 and a shoulder 52 of the slide in such a manner that the free end 53 of the slide permanently exerts on the bolt 36 a downwardly directed force. If the slot 44 is provided directly in the support 33 of the prism 3, a certain amount of clearance has to be ensured for the free passage and the sliding of the bolt 43 in this slot, which may result in a small amount of clearance and in vibrations of the prism 3, which are unacceptable for a good viewing. In order to eliminate this clearance, a movable member 54 is arranged so as to rotate about an axis 55 on the prism support 33. The slot 44 provided in the member 54 having the form of a truncated cone and terminating in downward direction by its widened part receives the bolt 43, which is permanently held in contact with the two edges of the slot 44 due to the fact that compression spring 56 pushes the free end of the member 54 downwards in the direction of the end 42 of the lever 39. The vibrations of the prism 3 in one or the other of its stable position indicated by full lines and by broken lines in FIG. 2 are thus avoided essentially, the vibrations due to the hinged disposition about the pivots, axes and bearings 41, 55 and 31 being in themselves negligible. It should be noted that, in order to cause the prism 3 to pass from one to the other stable position, it has to be ensured that the wheel 34 rotates by about half a revolution, this angle of rotation otherwise not being critical (it may be slightly more or less than $\pi$).

Preferably, the passage from the viewing position by day to the viewing position by night is accompanied by the fact that the light intensifier tube 7 is made automatically operative. This is achieved by a wheel 58 carried by the shaft 35 and by a microcontact 59 secured in the housing 1. The wheel 58 acts as a cam upon a leaf spring 60, the free end of which is held in a position in which it is supported by the push-button 62 of the microcontact 59 due to the fact that a projection 61 of the spring 60 situated on the opposite side with respect to the microcontact is held pressed against the periphery of the wheel 58. For the night position, this projection descends into an axial groove 63 provided for this purpose at the periphery of the wheel 58, which has the consequence that the push-button 62 is released and the electrical contact for the electric supply of the tube 7 in the microcontact 59 is established. For any different rotating position of the wheel 58 and especially for the viewing position by day, the electrical contact in the microcontact 59 is interrupted and the light intensifier tube 7 is not supplied.

Figure 3:
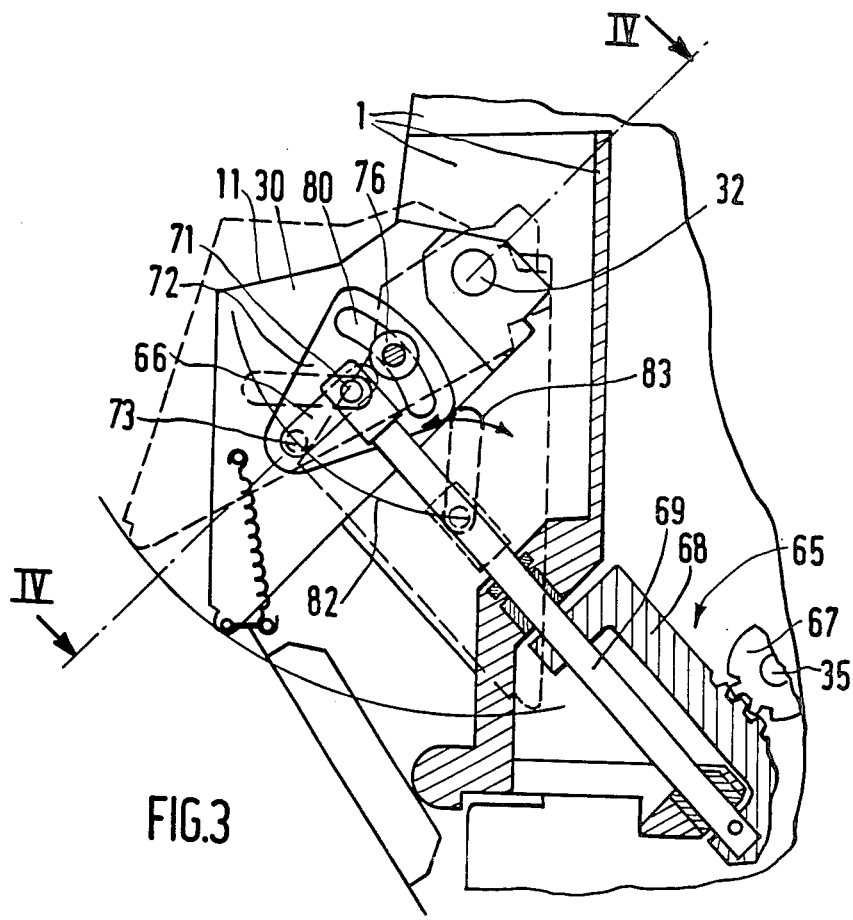
FIG. 3 shows a partial enlarged elevation of a part of FIG. 2 showing the embodiment of the means of displacing the second reflector.
Figure 4:
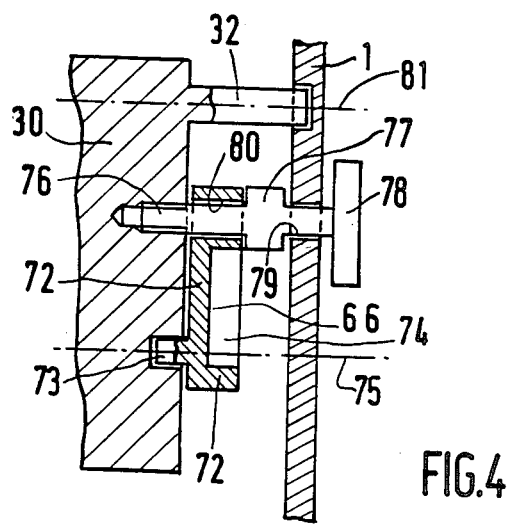
FIG. 4 shows in partial front-elevational sectional view taken on the line IV—IV of FIG. 3 the part of the displacement means used for displacing the second reflector.

The means for displacing the second reflector 11 shown in detail in FIGS. 3 and 4 essentially consist of drive means 65 which cooperates with a groove 66 of variable orientation on the support 30 of the second reflector (prism) 11, the groove 66 being shown in FIGS. 2, 3 and 4. The drive means 65 includes a pinion 67 carried by the shaft 35, which engages a toothed reel 68 integral with a rod 69. The rod 69 slides in two bearings arranged in the housing by a translatory movement in the direction of the support of the prism 11 and its free end carries a pin 71 which engages the groove 66 with a small amount of clearance. The groove 66 is provided in a movable member 72 rotatable about a pivot 73 in the prism support 30 and it should be noted that an end 74 of the groove 66 is situated on the axis 75 of the pivot 73. Blocking means constituted by a screw 76 are provided for fixing the movable member 72 to the prism support 30 in any desired relative position between these elements 72 and 30. The screw 76 is screwed into the support 30 and a part of its shank preferably traverses a slot 80 in the form of an arc of a circle provided in the member 72, this arc of a circle having its centre on the axis 75. In FIG. 4, the member 72 is shown in the non-blocked state. A shoulder formed on the shank of the screw 76 permits blocking by manually turning the head 78 of the screw. The pin of the screw 76 preferably traverses freely the housing 1 through a slot 79 in the form of an arc of a circle, whose centre lies on the axis 81 of the journalling means 32. In principle, the screw 76 is never in contact with the walls of the slot 79.

In the viewing position by day or active position shown in FIG. 3, the observer can regulate the position by rotation of the second reflector 11 in order to obtain the optimum ease of vision. For this purpose, it is sufficient for him to unscrew the screw 76 and to move it by its head 78 in the slot 79. If the pushing force is exerted in downward direction (or in upward direction), this has the effect that the prism 11 is tilted downwards (or upwards), the pin 71 remaining in a fixed position, which is imposed on it by the fixed position of the rod 69, while the axes 75, 81 plus the axis of the screw 76 remain in the same mutual position, that is to say that they are all three integral with the support 30. During this movement, the slot 66 slides along the pin 71 and the member 72 obtains with respect to the support 30 an orientation compatible with the structure of the mechanism described above. In FIGS. 2 and 3, the three aforementioned axes 75, 76, 81 are shown in the same plane, which is not absolutely necessary, but which ensures that a medium regulation position is obtained, the member 72 preferably having a plane of symmetry, from which position the same angular deflection of the prism 11 is possible in one or the other direction of rotation limited by the ends of slot 80. In FIG. 3, a broken line indicates the support 30 and the slot 66 in the highest possible position. When an adequate position has been reached by the observer, the latter screws the screw 76 so that the member 72 is immovably fixed to the support 30. For a given observer, this regulation is essentially ultimate. Irrespective of this starting position obtained by regulation, the return to the viewing position by night always brings the prism 11 back to the same concealed position by sliding of the pin 71 along the edges of the groove 66, this position being indicated by a broken line in FIG. 3 (elements 30, 66 and 71). The concealed position is that for which the pin 71 is located on the axis 75 after the latter has described an arc of a circle 82 centered at 81. The change of orientation of the member 72 in the concealed position, otherwise undesirable in order not to deregulate the orientation chosen beforehand for the viewing by day, cannot be obtained by a pushing force exerted on the screw 76. It should be noted that the slot 80 may be dispensed with; in order to ensure that the mechanism described above operates, it is sufficient that blocking of the member 72 is possible and the edge on the lefthand side of the slot 80 in FIG. 3 could also constitute a part of the external perimeter of the member 72. Instead of the screw 76, a screw could alternatively be used which is screwed through the member 72 and can enter into contact with the support 30.

Otherwise, the invention is not limited to a dsiplacement by rotation of the reflectors 3 and 11. Other movements are apparently possible and the first reflector 3 can especially pass from its night position to its day position (or conversely) by a translatory movement from the front to the back (or conversely).

What is claimed is:

1. A combined night/day viewing apparatus for driving a vehicle and contained in a single housing comprising
    a night path constituted by a movable first input reflector, an objective, a light intensifier tube, and an ocular, said first input reflector being mounted in a support carried by said housing
    a day path constituted by an optical system having an enlargement 1 and comprising said movable first input reflector and at least one second output reflector, the optical axes of the day path and the night path extending in the same plane parallel to a longitudinal axis of the vehicle and being inclined with respect to each other,
    displacement means for impressing a rotation on said first input reflector parallel to said plane so that light beams originating from said field of view are directed either to the optical axis of the day path or to the optical axis of the night path, journaling means being arranged for this purpose between the support of said first input reflector and said housing.

2. A combined night/day viewing apparatus as in claim 1 wherein the passage from the night path to the day path or conversely is effected by means for simultaneously displacing the first and second reflectors parallel to said plane in such a manner that the second reflector is in an active position for viewing by day, which is substantially that occupied by the output reflector of a known conventional day viewing apparatus, and is in a concealed position for viewing by night.

3. A combined night/day viewing apparatus as claimed in claim 2 wherein said means for simultaneous displacement comprises a toothed rack operated by a pinion that can be operated manually in said housing from said displacement means, said rack having fixed thereto a rod journaled in said housing, said rod having a free end carrying a pin which engages a groove provided in a movable part adapted to rotate about a pivot in the support of the second reflector, an end of said groove being situated on the axis of said pivot, blocking means being provided for immovably fixing said movable member to the support of the second reflector for any desired mutual orientation between these elements.

4. A combined night/day viewing apparatus as in claim 1 further comprising automatic obturation means of the day path and automatic means for making operative the light intensifier tube during the passage from the day path to the night path, which causes the second reflector to pass from an active position for viewing by day to a concealed position for viewing by night.

5. A combined night/day viewing apparatus as claimed in claim 4, wherein said obturation means of the day path comprise a shutter hinged on the support of the second reflector and pulled by first spring means to a first stable opened position or a second stable closed position, and in that the passage from the first to the second position of said shutter during the passage of the second reflector from the active position to the concealed position is obtained by dynamic contact between an embossed part provided for this purpose on said housing and said shutter.

6. A combined night/day viewing apparatus as claimed in claim 5, wherein said shutter comprises a flexible thick material for contacting said embossed part and for supporting the front part of the observer's body during viewing by night.

7. A combined night/day viewing apparatus as claimed in claim 1 wherein said first and second reflectors are constituted by total-reflection prisms and in that the part of said optical system which extends along the optical axis of the day path is constituted by a prism substantially in the form of a parallelepiped.

8. A combined night/day viewing apparatus as claimed in claim 7, characterized in that said prism substantially in the form of a parallelepiped has a cylindrical recess which partly receives said objective of the night path therein.

9. A combined night/day viewing apparatus as claimed in claim 1 wherein said displacement means comprises a lever having opposed first and second ends pivotable about a pivot integral with said housing and lying between said ends, said second end carrying a second bolt which engages a second slot associated with the support of the first reflector and said first end having a first slot which engages a first bolt integral with a wheel that can be operated manually in said housing, while second spring means are provided for urging said first bolt in the direction of the first end.

10. A combined night/day viewing apparatus as claimed in claim 9, wherein said second slot is in the form of a truncated cone and is provided in a movable part adapted to rotate about an axis integral with the support of the first reflector, in that third spring means hinge said movable part in such a manner that said second bolt is in permanent contact with the two edges of said second slot, and in that said second spring means are integral with said lever and act upon this lever by a slide in such a manner that the latter permanently exerts a pressure on said second bolt.

11. A combined night/day viewing apparatus as in claim 1 characterized in that it comprises means for a binocular viewing by night and in that its right field is of the order of 80°×50° with an enlargement close to 1.

12. A combined night/day viewing apparatus as in claim 1 wherein said displacement means impresses a rotation on the order of ten to twenty degrees on said first reflector.

* * * * *